United States Patent [19]

Krieg et al.

[11] 4,242,584
[45] Dec. 30, 1980

[54] METHOD FOR SEPARATING ISOTOPES WHICH ARE IN THE FORM OF MOLECULES

[75] Inventors: Gunther Krieg; Wolfgang Obert, both of Karlsruhe, Fed. Rep. of Germany

[73] Assignee: Kernforschungszentrum Karlsruhe Gesellschaft mit beschränkter Haftung, Karlsruhe, Fed. Rep. of Germany

[21] Appl. No.: 698,499

[22] Filed: Jun. 22, 1976

[30] Foreign Application Priority Data

Jun. 28, 1975 [DE] Fed. Rep. of Germany ....... 2528953

[51] Int. Cl.$^2$ .............................................. B01D 59/00
[52] U.S. Cl. ................................................. 250/423 P
[58] Field of Search ................................... 250/423 P

[56] References Cited

U.S. PATENT DOCUMENTS

| | | | |
|---|---|---|---|
| 3,937,956 | 2/1976 | Lyon | 250/423 P |
| 4,107,536 | 8/1978 | Peters | 250/423 P |

*Primary Examiner*—Alfred E. Smith
*Assistant Examiner*—T. N. Grigsby
*Attorney, Agent, or Firm*—Spencer & Kaye

[57] ABSTRACT

A method is provided for separating isotopes of an element where the isotopes are present in the form of molecules and where the isotopes participate in the vibrations of the molecules and are excited by means of radiation and then separated. Isotopes or elements with a defined nucleon-number are selected in which a shift of the band edges in their absorption spectra is present due to the isotopy effect, and radiation that is used lies within that frequency interval in which the absorption coefficient of one isotope of an isotope mixture or several isotopes of an isotope mixture is greater than that of the other isotope or the remaining portion of the isotopes, respectively.

6 Claims, 4 Drawing Figures

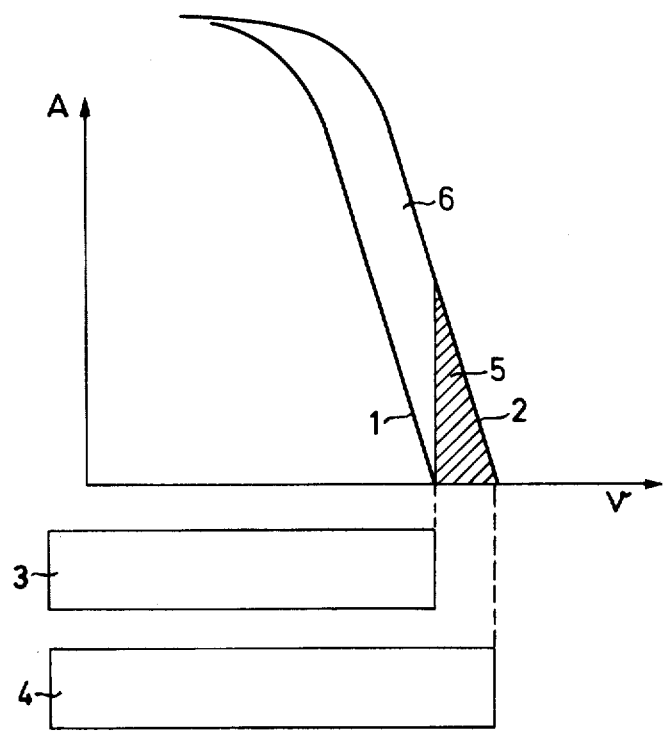
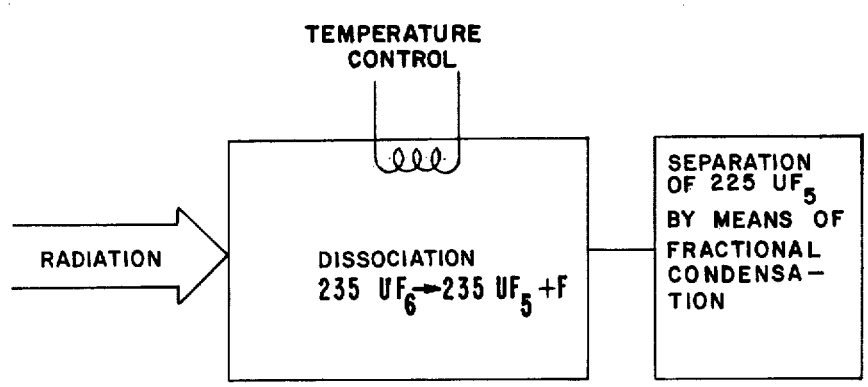

METHOD FOR SEPARATING ISOTOPES WHICH ARE IN THE FORM OF MOLECULES

BACKGROUND OF THE INVENTION

The present invention relates to a method for separating isotopes of an element where the isotopes are present in the form of molecules and where the isotopes take part in the vibration of the molecules and can be selectively excited by means of radiation, and then separated.

Such a process is known from German Offenlegungsschrift No. 1,959,767, hereby incorporated by reference, but this process is limited to the separation of the $U^{235}$ and $U^{238}$ isotopes where the respective type of atom is used to form molecules which have an absorption characteristic (vibration-rotation line) corresponding to the emission line of a laser, preferably a $CO_2$ laser. In this process, the uranium atom participates in the vibrations of the molecule (e.g., $UF_6$ molecules containing $U^{235}F_6$ molecules and $U^{238}F_6$ molecules), a reaction mixture is produced by the addition to the isotopic molecules of one or a plurality of reaction partners to form a reaction mixture and this mixture is irradiated by the laser to excite the molecules isotope—specifically in their vibration-rotation spectra. A chemical reaction takes place and, upon completion of the chemical transformation of the irradiated portions of the reaction mixture, the various molecules are separated in a known manner, for example, by fractional condensation. Consequently, monochromatic light must be employed, so that only molecules containing the type of isotope in question are excited and no other molecules, i.e., the $CO_2$ laser is selectively tuned to one line. However, since molecular spectra have a plurality of absorption lines, the irradiation of only one certain resonance line is able to selectively excite at most a very small fraction of all isotopes. It is therefore impossible to economically produce significant quantities of gas with selectively excited molecules. Moreover, at room temperature, the average line density of $UF_6$, inter alia, is so great that, as a result of the natural width of the lines, spread by Doppler and pressure effects, the lines will overlap. The know spectra, for example, of $UF_6$ indicate that the vibration-rotation bands of the $UF_6$ molecules constitute a quasi continuum. If, therefore, a laser line is irradiated which coincides with an absorption line of the molecule to be selectively excited, the excitation will be selective only if in the quasi continuum of the other isotope there happens to be a gap, i.e., no absorption line. Such gaps have not as yet been found.

These drawbacks can be reduced to a limited degree by substantially lowering the temperature of the gas which decreases the number of the various molecular states, the line density, and the Doppler and pressure spreading. However, a lowering of the temperature has the simultaneous result that the vapor pressure, i.e., the molecular density of $UF_6$, is greatly reduced. The chemical reactions to take place upon completion of the selective excitation can thus no longer be effected with the large quantities of gas required for economical operation of the process.

SUMMARY OF THE INVENTION

It is therefore a primary object of the present invention to provide a process of the above-mentioned type in which it is possible to increase the separating effect, in that an intensive but not necessarily highly sharp-lined radiation is fully utilized and a high molecular density can be employed.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention, as embodied and broadly described, provides a method for separating isotopes of an element where the isotopes are present in the form of molecules and where the isotopes participate in the vibrations of the molecules and are excited by means of radiation and then separated, which comprises selecting isotopes in which a shift of the band edges in their absorption spectra is present due to the isotopy effect, and exciting the isotopes with radiation that lies within that frequency interval in which the absorption coefficient of one isotope of an isotope mixture or several isotopes of an isotope mixture is greater than that of the other isotope or the remaining portion of the isotopes, respectively.

It is to be understood that both the foregoing general description and the following detailed description are exemplary, but are not restrictive of the invention.

BRIEF DESCRIPTION OF THE DRAWINGS

The accompanying drawings, in which like numbers indicate like parts, illustrate examples of presently preferred embodiments of the invention and, together with the description, serve to explain the principles of the invention.

Of the drawings:

FIG. 1 is a schematic diagram showing the absorption A as a function of frequency $\nu$ in the range of the band edges of both isotopes $U^{238}$ and $U^{235}$ for $UF_6$ as a gas.

FIG. 4 shows a flow sheet illustrating the method of the present invention.

DESCRIPTION OF THE PREFERRED EMBODIMENTS

Figure 2:
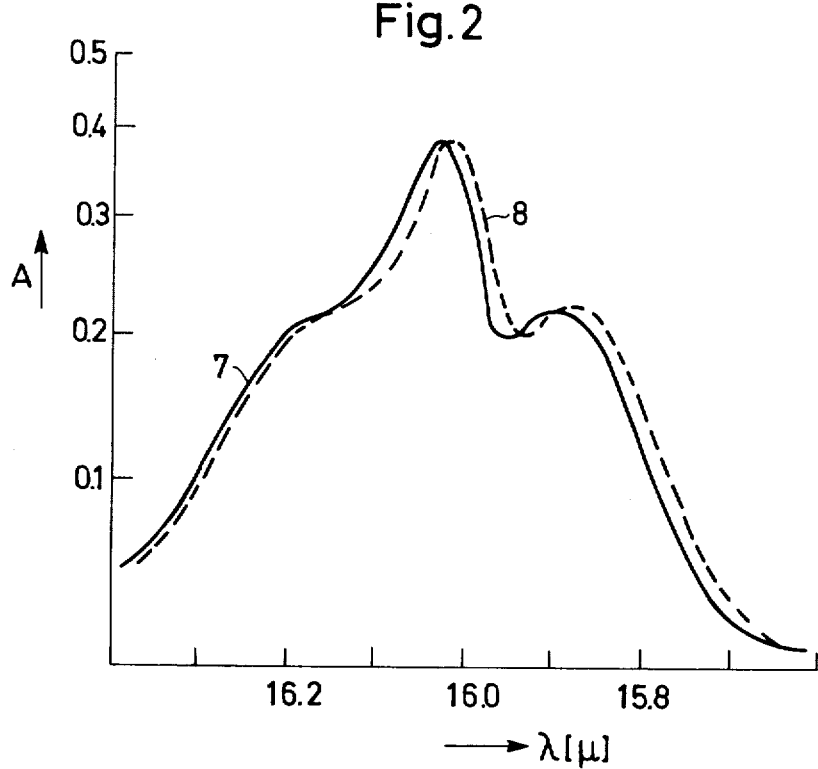
FIG. 2 shows the measured absorption spectra of both $UF_6$ isotopes $U^{238}$ and $U^{235}$.

The shifting of band edges as a result of the isotopy effect in vibration-rotation spectra of molecules is known. However, persons skilled in the art (Farrar, Smith K-L-3054, Revision 1, Mar. 15, 1972) did not recognize the advantage and usability of this effect to solve the above-mentioned problem.

An advantageous embodiment of the process of the present invention provides for use of a frequency range for the exciting radiation which includes frequencies which fully selectively excite exclusively the one isotope of an isotope mixture or several isotopes of an isotope mixture. In additional embodiment is to excite one or several isotopes of the isotope mixture preferably.

The particular advantages which, in part, are to be considered inventive embodiments of the process of the present invention are that it is possible to simultaneously excite very many (for $UF_6$, for example, about $10^5$) absorption lines, i.e., a large portion of all molecules of the one isotope are simultaneously excited, and that light radiation can be effected, for example, for UF$_6$, for one selected molecule of all conceivable molecules, e.g., in the case of full selectivity within a frequency range of about 0.65 cm$^{-1}$ in width which lies between the band edges of the two isotopes so that Doppler and impact spreading (about $5 \times 10^{-4}$ cm$^{-1}$), will have no influence. Thus, the irradiation can be effected at high UF$_6$ molecular densities, i.e., at temperatures of about 300 K, so that the subsequent chemical reactions which are performed with conventional means can take place with sufficiently high reaction rates. After chemical reaction, the isotopes are separated by conventional means (see e.g. DOS 1,959,767).

With a suitably selected temperature, it is also possible to shift the maximum of occupation density into the area of the band edges which yields a stronger decline of the absorption curve and also an arise of the absorption coefficient. Therefore the yield per volume unit in the process of the present invention is additionally improved. The optimum temperature, depending on the molecules of interest, lies between the lower limit-temperature $T_1$ which defines a sufficient vapor pressure and the upper limit-temperature $T_2$ for the dissociation of the molecules. It is further possible to use the method of the present invention for measuring the concentration or concentration ratios, respectively, of isotopes. This will be made by the measurement of the absorbance of the radiation in the above mentioned frequency range between the band edges which yields directly the particle number of the excited isotope. Together with the determination of the entire particle number the concentration or the concentration ratios can be calculated.

A further advantage of the present invention is obtained in that the spacing of the band edges for isotopic molecules (e.g., at 0.65 cm$^{-1}$ for UF$_6$) is relatively great and the light source need not necessarily be a laser. Any light source whose spectrum is narrowed down, for example, to the above-mentioned frequency interval is applicable. This also applies for other types of isotopes, for example, those of sulfur in the compound SF$_6$ with an absolute isotopic shift $\Delta\nu$ of $\sim 20$ cm$^{-1}$ and relative shift of $\Delta\nu/\nu$ ($\sim 20/940$) of 2% of the $\nu_3$ band, as well as for the isotopes HD and H$_2$ with relative a shift $\Delta\nu/\nu$ of 12%.

The present invention will be explained in detail with the aid of a selected exemplary embodiment which is not intended to limit the process of the invention and with the aid of three drawing figures.

The isotopy effects in molecular spectra are greater by orders of magnitude than those in atom spectra. Consequently, the process of the invention is particularly suited for isotopes with small relative mass differences, i.e., for the isotopes of the heavy elements. A fully selective excitation of isotope-molecule compounds becomes possible if the irradiation lies in a frequency range which lies between the band edges, for example, between the band edges of the two isotopes U$^{238}$ and U$^{235}$ of the molecular compound UF$_6$. The spectrum of the light isotope U$^{235}$ results from that of the heavy isotope U$^{238}$ when all frequencies of the heavy isotope are increased by a constant value of the vibration isotopy shift. An additional isotopy effect generally results due to molecular rotation. During the transition from the heavy to the light isotope, this rotation effects a change such that the absorption lines of the light isotope U$^{235}$ are additionally shifted toward higher frequencies. The rotation isotopy effect is generally small, however, compared to the vibration isotopy effect. For symmetrical molecules, such as, for example, UF$_6$, it disappears completely.

Turning now to FIG. 1, there is shown, schematically, for UF$_6$ as a gas, the absorption A as a function of frequency $\nu$ in the range of the band edge 1 of the isotope U$^{238}$ and the band edge 2 of the isotope U$^{235}$. Although the spectrum 3 and 4 of each isotope constitutes a quasi continuum, selective excitation of the light UF$_6$ isotope is possible. In the region 5 shown by the shaded area, excitation can be fully selective. In the remaining region 6, between band edges 1 and 2, excitation will be partially selective, i.e., the light isotopes U$^{235}$ are excited with priority compared to the heavy isotopes U$^{238}$. Experiments have furnished a vibration isotopy shift of $0.65 \pm 0.09$ cm$^{-1}$.

Figure 3:
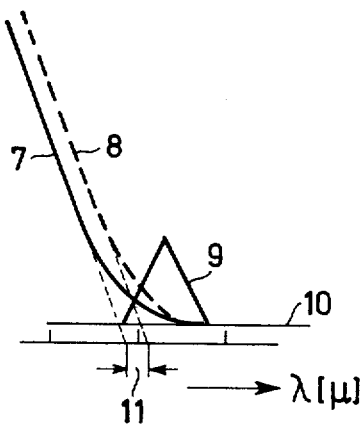
FIG. 3 shows, in greater detail, the opening function of the measured absorption spectra of FIG. 2.

FIG. 2 shows measured absorption spectra of both UF$_6$ isotopes U$^{238}$ and U$^{235}$ with the U$^{238}$ absorption spectra being shown by curve 7 and the U$^{235}$ absorption spectra being shown by curve 8. The absorption A is plotted over the wavelength $\lambda$ and $\mu$. After standardizing the two curves 7 and 8 to the same amplitude and under consideration of the opening function 9, shown in the detail drawing of FIG. 3, of the spectrometer employed (not shown in detail) and of the given zero line 10, it can be seen that complete or partially selective excitation, respectively, of the light isotope U$^{235}$ is realized in the region between the band edges. (See the right of FIG. 2). The spacing 11 of the band edges is $\Delta\nu \approx 0.65$ cm$^{-1}$.

FIG. 4 is a flow diagram illustrating the practice of the method according to the invention. As is illustrated in FIG. 4, the process is carried out by applying exciting radiation to an isotope mixture while controlling the temperature at which the mixture is maintained. This produces dissociation of the 235 UF$_6$ molecules into 235 UF$_5$ molecules and fluorine. After removal of the fluorine, the 235 UF$_5$ molecules are separated, for example by fractional condensation.

It will be understood that the above description of the present invention is susceptible to various modifications, changes and adaptations, and the same are intended to be comprehended within the meaning and range of equivalents of the appended claims.

What is claimed is:

1. In a method for separating isotopes of an element where the isotopes are in the form of molecules and where the isotopes participate in the vibrations of the molecules, which method includes exciting such molecules by means of radiation and then separating the molecules of at least one isotope from the molecules of at least one other isotope, the improvement comprising selecting isotopes in which a shift of the band edges in their absorption spectra is present due to the isotopy effect, and exciting the isotopes with radiation from a source whose spectrum extends across the region between the band edges of the one isotope and the other isotope, said exciting being a simultaneous excitation of a plurality of absorption lines.

2. The method as defined in claim 1 wherein a light source is employed whose radiation frequencies correspond to the frequency range.

3. The method as defined in claim 1 wherein a laser is employed whose radiation frequencies correspond to the frequency range.

4. The method as defined in claim 1 wherein a temperature is used which optimizes the method.

5. The method as defined in claim 1 including determining the concentration or concentrations ratio, respectively, of the isotopes.

6. Method as defined in claim 1 wherein the temperature is selected so that the maximum occupation density is in the area of the band edges.

* * * * *